Feb. 26, 1963 G. BUTENUTH ETAL 3,079,325

DEVICE FOR CARRYING OUT ENDOTHERMAL REACTIONS IN THE ELECTRIC ARC

Filed April 13, 1960 4 Sheets-Sheet 1

INVENTORS
GUNTHER BUTENUTH,
KURT MELTENDORF,
HELLMUTH GABLER,
KURT SENNEWALD.
BY
Connolly and Hutz
ATTORNEYS Feb. 26, 1963 G. BUTENUTH ETAL 3,079,325
DEVICE FOR CARRYING OUT ENDOTHERMAL
REACTIONS IN THE ELECTRIC ARC
Filed April 13, 1960 4 Sheets-Sheet 2

INVENTORS
GUNTHER BUTENUTH,
KURT MELTENDORF,
HELLMUTH GABLER,
KURT SENNEWALD.
BY
Connolly and Hutz
ATTORNEYS Feb. 26, 1963 G. BUTENUTH ET AL 3,079,325
DEVICE FOR CARRYING OUT ENDOTHERMAL
REACTIONS IN THE ELECTRIC ARC
Filed April 13, 1960 4 Sheets-Sheet 3

INVENTORS
GUNTHER BUTENUTH,
KURT MELTENDORF,
HELLMUTH GABLER,
KURT SENNEWALD.
BY
Connolly and Hutz
ATTORNEYS INVENTORS
GUNTHER BUTENUTH,
KURT MELTENDORF,
HELLMUTH GABLER,
KURT SENNEWALD
BY
Connolly and Hutz
ATTORNEYS United States Patent Office 3,079,325
Patented Feb. 26, 1963

3,079,325
DEVICE FOR CARRYING OUT ENDOTHERMAL REACTIONS IN THE ELECTRIC ARC

Günther Butenuth and Kurt Meltendorf, Knapsack, near Koln, Hellmuth Gäbler, Koln-Klettenberg, and Kurt Sennewald, Knapsack, near Koln, Germany, assignors to Knapsack-Griesheim Aktiengesellschaft, Knapsack, near Koln, Germany, a corporation of Germany Filed Apr. 13, 1960, Ser. No. 21,927
Claims priority, application Germany Apr. 17, 1959
13 Claims. (Cl. 204—328)

Figure 1:
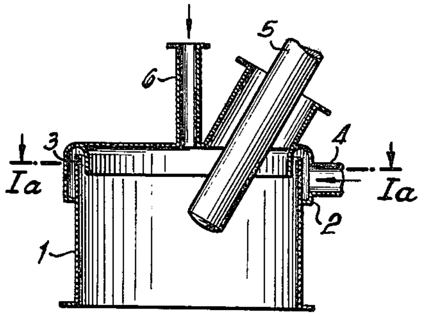
Figure 1A:
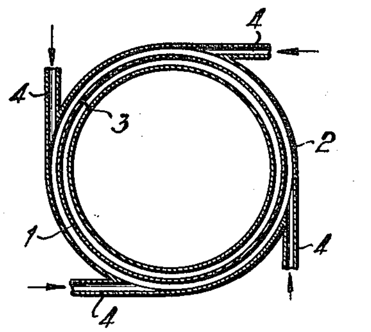

The present invention relates to a device suitable for use in carrying out endothermal reactions in the electric arc, especially for thermally cracking liquid or gaseous hydrocarbons, for example for the production of acetylene. During this reaction an additional gas may be introduced from the outside into the reaction space proper as reaction partner which enables the most various endothermal chemical reactions to be carried out.

Various processes and devices are known for thermally cracking hydrocarbons in an arc. In view of the fact, however, that at a given density of energy in the reaction zone and with an increasing electric power, the ratio of the reaction zone volume to its cooling surface becomes rapidly less favorable with respect to the thermal resistivity of the construction materials used for making the reaction zone, the electric power that can be converted is limited to an extent such that these processes and devices cannot be used on an industrial scale.

The present invention enables these difficulties to be overcome and provides a device of great capacity suitable for use in continuous operation.

The device according to this invention which is used for carrying out endothermal reactions in the electric arc, especially for cracking hydrocarbons in order to obtain acetylene, for example, comprises a furnace head, preferably of circular-cylindrical shape, which is provided with means to receive the electrodes projecting into the combustion chamber the lower part of which serves as reaction zone, with means producing a layer of rotating liquid starting material that serves as combustion chamber lining, and also provided, if desired, with means for the supply of an auxiliary gas, and connected via an intercalated shutter to a furnace center section; the furnace center section is provided with means for the supply of a liquid chilling agent to the hot, vaporous or gaseous reaction product or cracked product, and mounted on a furnace base section; the furnace base section is equipped with means to receive a stock of liquid starting material, means to receive the chilling agent which is precipitated in hot condition, means to receive the vaporous and/or gaseous reaction product or cracked product, and with means to cool and convey the starting material; the entire device being sealed in gas-tight and liquid-tight manner with respect to the outside.

The device described above is substantially operated as follows: the reaction or cracking is carried out in a combustion chamber the lower part of which serves as reaction zone, and in the following series-connected zones, which comprise an axially symmetrical, preferably circular-cylindrical furnace head and an analogous furnace center section within which a liquid hydrocarbon is caused to rapidly gyrate by mechanical forces, the cracked products or the reaction products obtained are then chilled, whereby the said hydrocarbon serves as starting material which is cracked or reacted by the immediate heat generated by the arc or by the heat transmitted by the additional gas and which, at the same time, serves as cooling agent, especially for cooling the furnace head, as chilling agent to chill the cracked products or reaction products obtained, and also serves as conveying agent to convey solid cracked products or reaction products that may form.

More especially, the device according to this invention comprises as the essential feature an advantageously circular-cylindrical furnace head in which a layer of oil rotates and forms the combustion chamber to receive the electric arc, an arc burner disposed at the upper end of said furnace head so that the electrodes project into said combustion chamber, a furnace center section connected to the lower end of said furnace head, a shutter interposed between the lower end of the furnace head and the upper end of the furnace center section, and a furnace base section on which the furnace center section is mounted, the whole device being sealed in gas-tight and liquid-tight manner with respect to the outside.

The electrodes in the furnace head are centrally arranged and provided with control and regulating means.

The head of the furnace carries a gas inlet tube.

The upper part of the furnace head is surrounded by an outer closed annular channel carrying supply lines projecting tangentially into said channel, and connected by means of a circular slit with a second inner channel open at its lower side and disposed in the interior of the furnace head.

According to a further variant of this invention the upper part of the furnace head is surrounded by a closed annular channel carrying supply lines projecting tangentially into said channel, the internal side of which is formed by a ring provided with slits that project tangentially into the interior of the furnace head.

At a position below the furnace head a horizontal shutter is arranged which serves as a support for the liquid hydrocarbon which is caused to rapidly gyrate within the furnace head and above said shutter.

The shutter used is a circular plane plate provided with a central bore hole.

In another variant according to this invention, the plate used as shutter is equipped with guide vanes.

According to a still further variant the shutter is composed of a number of conical or cylindrical pins that project radially into the furnace head and are uniformly arranged in annular manner.

Also, a funnel-shaped shutter which is centrally disposed in the furnace head to leave an annular slit and the lower smaller opening of which is provided with a cylindrical short pipe that is open at both ends can be used.

The short pipe is provided with inlet conduits that project into the interior of said pipe radially or tangentially and serve to introduce an additional gas.

The furnace center section is provided with spraying nozzles at a position below the shutter.

The furnace center section and furnace head are mounted on a furnace base section that serves as reservoir for the liquid hydrocarbon to be worked. The reservoir is equipped with short outlet pipes for the dissipation of reaction gases, the removal of cycled oil and for the supply of fresh oil.

The device also comprises a circulating pump and a continuous cooler for the cycle oil.

Figure 2:
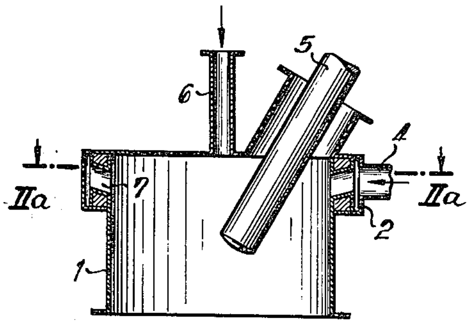
Figure 2A:
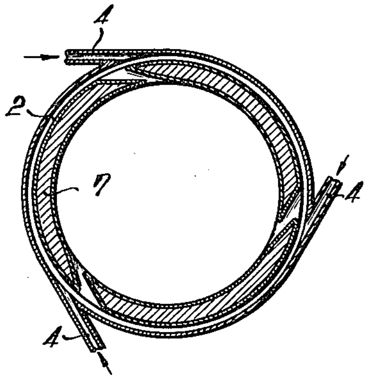
Figure 7:
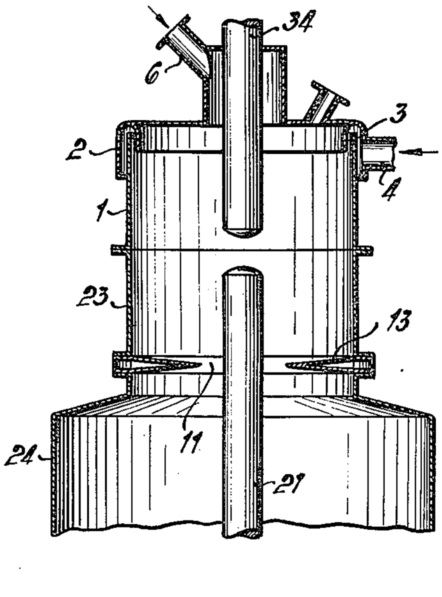
Figure 8:
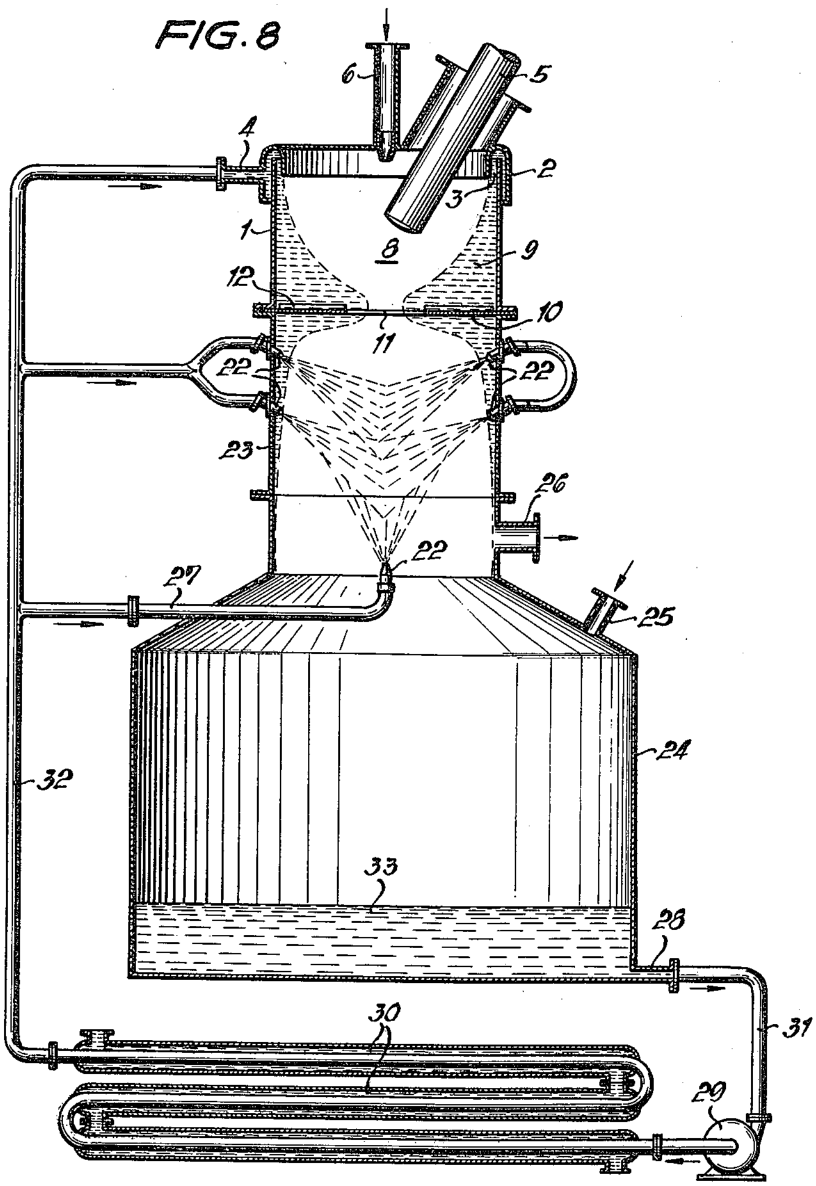

A device suitable for use in this invention is shown diagrammatically in longitudinal and cross-sectional views in the accompanying drawings. FIGS. 1 to 7 represent individual parts of the device and FIG. 8 a view of the entire device. FIGS. 1 and 2 primarily relate to means to force the hydrocarbon to be worked to rotate within the furnace head, whereas FIGS. 3 to 6 represent variants of the shutter disposed between the furnace head and the furnace center section. FIG. 7 illustrates an advantageous electrode arrangement for direct current operation and FIG. 8 represents the whole device.

The device according to this invention comprises three principal parts: furnace head, furnace center section and furnace base section.

As shown in FIG. 1, the furnace head is an axially symmetrical, advantageously cylindrical steel sheet vessel 1 open at its lower end and closed at its upper end. This vessel serves to receive the combustion chamber proper.

As shown in FIGS. 1 and 2, the electrodes 5 which constitute the arc burner, are arranged in gas-tight manner in the upper part of the furnace head so that the arc can form in the interior of the furnace head or the combustion chamber. The device is designed for three-phase-current operation whereby of the three electrodes regularly disposed in a cycle one is shown in FIG. 1 and one is shown in FIG. 2.

The manner in which to tighten, adjust and regulate the electrodes need not be discussed as this is outside the scope of the present invention.

In addition to the electrodes the upper part of the furnace head carries a gas inlet tube 6.

The upper border of the furnace head is surrounded by an annular channel 2 which is closed with respect to the outside and into which the oil supply pipes 4 project tangentially.

The term "oil" as used herein is intended to mean the liquid hydrocarbon to be treated irrespective of its specific composition. It is obvious that substances other than hydrocarbons may also be treated.

The outer channel 2 leaves a slit around the upper edge of container 1, through which slit the oil can enter into the inner channel 3 which is open at its lower end, and flow into the interior of container 1.

A variant of this embodiment is shown in FIG. 2 in longitudinal view and in cross-sectional view along the line I*Ia*—I*Ia*. The inner side of annular channel 2 facing container 1 is constituted by a ring 7 which is provided with tangential slits regularly distributed in annular manner.

The outer and inner annular channels or outer annular channel and ring with the tagential slits and oil supply pipes taken together form twisting chambers.

On introducing oil through the oil inlets 4 an oil layer is produced on the inner side of container 1. This layer of oil circulates on said inner side of container 1 and at the same time sinks down under the action of gravity. This rotating oil layer forms the combustion chamber proper.

Tests have shown that a non-circulated liquid hydrocarbon, even if introduced at a great velocity from above to below in vertical or inclined direction, for example through an annular slit, does not satisfy the requirements demanded with respect to the thermal stabiliztaion at a greater furnace capacity.

It has also been observed that the layer of rotating oil could be used for producing a satisfactory thermal protection but the cracked products are then obtained in an unsatisfactory yield.

Figure 3:
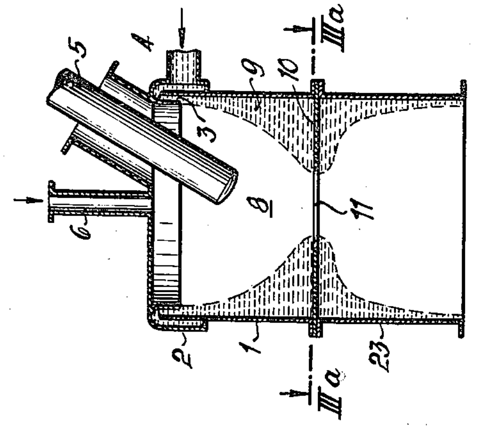
Figure 3A:
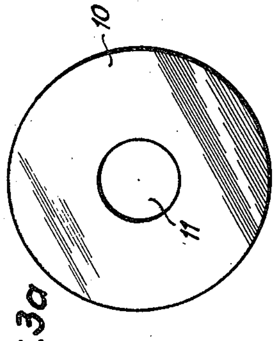

According to a further embodiment of this invention, good thermal stabilization can be achieved and cracked products obtained in a good yield by inserting a shutter with a central aperture at a position below the furnace head. As shown in FIG. 3, the furnace head is mounted on the furnace center section 23, i.e. a circular-cylindrical steel plate vessel which is open at both ends. The shutter 10 is disposed between the furnace head and the furnace center section. In the variant shown in FIG. 3 and FIG. 3*a*, the shutter 10 is a plane, circular disk with a central aperture 11. By the insertion of said disk the cross-section of the oil layer 9 is so modified (as shown in FIG. 3) that an axially symmetrical free space 8 having nearly a paraboloidic longitudinal section, which is surrounded by the rotating oil and serves as combustion chamber and reaction zone, respectively, for the arc is formed within the furnace head.

The shape of the combustion chamber depends in complicated manner on the dimension of the furnace head, the properties of the oil used, the velocity with which it is introduced, the surface of container 1 and shutter 10, and the effective size of aperture 11.

Figure 4:
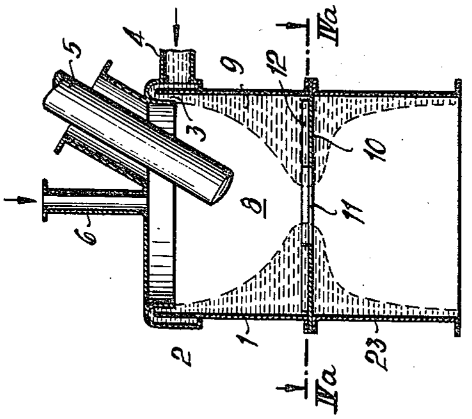

After having been passed through aperture 11, the energy of rotation inherent in the rotating oil layer presses the latter against the walls of furnace center section 23 as show in FIGS. 3 and 4.

Figure 4A:
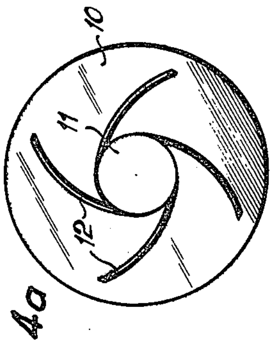

The effective size of aperture 11 can be modified by various measures with respect to the value that corresponds to its geometrical dimensions. In the variant shown in FIG. 4 and FIG. 4*a*, for example, the surface of shutter 10 carries oil flow guide vanes 12 which modify the conditons of oil flow so that the effective size of the aperture is smaller than corresponds to the geometrical dimensions of aperture 11.

Figure 5:
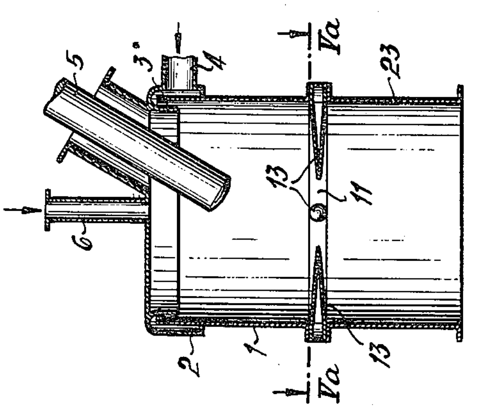
Figure 5A:
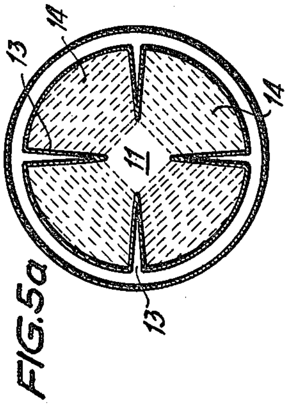

A still further variant is shown diagrammatically in FIG. 5 and FIG. 5*a*. In this embodiment of the present invention the shutter 10 is replaced by a number of conical or cylindrical pins 13 which are radially arranged in one plane and regularly distributed in annular manner. These pins leave an aperture 11 in the center of the plane which they form. The oil blankets 14 that form at the pins have in this embodiment the same function as the solid shutter 10 described above.

Figure 6:
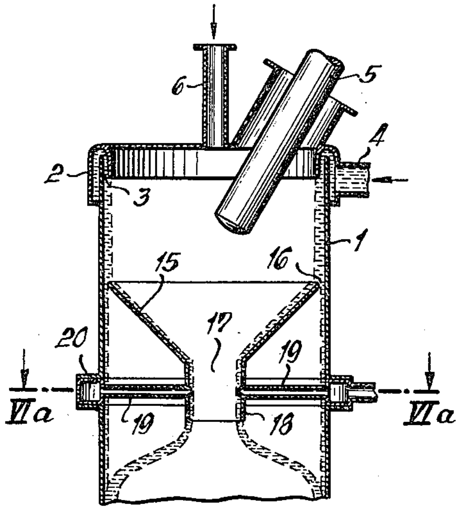
Figure 6A:
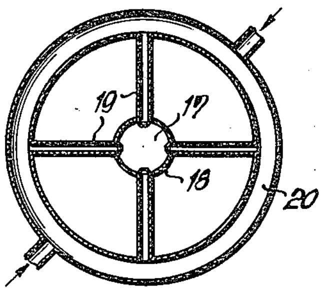

As shown in FIG. 6, the shutter may be funnel-shaped (funnel-shutter 15) so as to leave an annular slit 16 between funnel-shutter 15 and the inside wall of the furnace head. This slit permits the formation of an oil layer even on those parts of the inside walls of the furnace head and furnace center section which are covered by funnel-shutter 15 against the arc. The central aperture 17 of funnel-shutter 15 is advantageously connected to a short pipe 18 which is preferably of cylindrical design at its upper and lower ends. The short pipe may be provided, if desired, with gas inlet tubes 19 that project tangentially or radially into said pipe and that are supplied via annular channel 20 surrounding the furnace center section with an additional gas which serves as reactant and/or supplemental heat carrier.

The funnel-shutter has proved especially advantageous for the introduction of a hydrocarbon in gas or vapor form.

An electrode arrangement which is especially suitable for use in direct-current operation is shown diagrammatically in FIG. 7. The two electrodes 21 and 34 are arranged one above the other along the axis of the furnace.

FIG. 8 represents diagrammatically a longitudinal section through the whole device. The furnace head and furnace center section are mounted on the furnace base section 24. The latter is a closed container open at its upper side and serves as reservoir for the cycled oil 33. By means of circulating pump 29 the hot cycling oil 33 is withdrawn from the furnace base section 24 through short pipe 28 and conduit 31, cooled in continuous cooler 30 and forced into conduit 32. The latter is branched so that the bulk of the cooled cycling oil is conveyed through supply line 4 into the annular channel disposed at the surface head, while portions thereof are conveyed to spraying nozzles 22 which are arranged either in the walls of the furnace center section 23 or at a position below the furnace center section starting from short pipe 27, and chilled in order to retain the proportions of the cracked products or reaction products corresponding to the chemical equilibrium attained in the reaction zone. The reaction products in gas and/or vapor form are withdrawn from the furnace base section 24 via short pipe 26. Short pipe 25 serves to introduce fresh oil.

The working conditions can be modified within wide limits. The nature of the chemical-physical processes depends entirely on the working conditions selected. As follows from this statement, the quantity and nature of the resulting cracked or reacted products will widely differ.

When the device is operated in the absence of an additional gas, the constituents of the cycled oil are most likely subjected to thermal cracking.

When, however, an additional gas, for example hydrogen, is introduced through gas inlet tube 6, the hydrogen molecules are also thermally dissociated under appropriate conditions, whereby the oil is cracked by the heat set free during the recombination of the hydrogen atoms, and the hydrogen may react with one cracked product or the other.

The additional introduction of a hydrocarbon in gas or vapor form through gas inlet tube 6 may also involve interesting rearrangement reactions.

Instead of through gas inlet tube 6 an additional gas or vapor may be introduced into the arc, for example, through one of the annular slits which surround the individual electrodes or through a longitudinal bore hole in the electrodes.

The results obtained with a device as described herein were satisfactory. Due to the thermal stabilization achieved with the layer of rotating oil the device could be operated for hours without damage being done to the furnace head in spite of the high charge of 1–3.10$^8$ kcal./m.$^3$h. of the combustion chamber. For the treatment of crude oil or gasoline about 5–6 kw.h. energy were consumed per kg. reaction gas. The gases obtained were composed, for example, of about 70% by volume hydrogen, 16% by volume acetylene, 5–6% by volume ethylene and other hydrocarbons. 8–9 kw.h. energy were consumed per kg. acetylene.

We claim:

1. A device for thermally cracking hydrocarbons with the aid of a gaseous heat carrier heated in an electric arc which comprises in combination a circular-shaped furnace head serving as reaction chamber, means disposed on top of said furnace head to receive electrodes projecting into said furnace head, means disposed at said furnace head to tangentially introduce liquid starting material and to produce a coherent rotating layer of the same onto the inside of the cylindrical part of the furnace head, an inlet tube for additional gas supply vertically disposed on top of said furnace head for the supply of an additional gas to be heated in the electric arc and serving as heat carrier, a furnace center section connected with said furnace head, a horizontal shutter inserted between said furnace head and said furnace center section, a series of sprinkling nozzles circumferentially disposed on said furnace center section, a furnace base section being tightly connected with said furnace center section and serving as a receptacle for the liquid starting material and for the gaseous reaction products, means to feed part of the liquid starting material confined in said furnace base section through a cooling installation, an inlet tube for supplementing liquid starting material consumed, and an outlet tube for withdrawing gaseous reaction products, the entire device being sealed in gas-tight and liquid-tight manner with respect to the surrounding exterior.

2. A device as claimed in claim 1, which comprises means for controlling and regulating the electrodes, said electrodes and said means being centrally disposed in the furnace head.

3. A device as claimed in claim 1, which comprises an outer closed annular channel surrounding the upper part of the furnace head to leave an annular slit, supply lines projecting tangentially into said channel, and an inner annular channel open at its lower end disposed in the interior of said furnace head, said outer annular channel being connected to said inner annular channel through said annular slit.

4. A device as claimed in claim 1, which comprises a closed annular channel surrounding the upper part of the furnace head, supply lines projecting tangentially into said channel, a ring provided with slits that project tangentially into the interior of said furnace head, said ring constituting the inner side of said annular channel.

5. A device as claimed in claim 1 wherein the shutter is a circular, plane plate having a central aperture.

6. A device as claimed in claim 5, wherein the plate used as shutter carries guide vanes.

7. A device as claimed in claim 1, wherein the shutter is composed of a series of conical pins that are regularly arranged in annular manner and project radially into said furnace head.

8. A device as claimed in claim 1, wherein the shutter is composed of a series of cylindrical pins that are regularly arranged in annular manner and project radially into said furnace head.

9. A device as claimed in claim 1, which comprises a funnel-shaped shutter centrically disposed in the furnace head to leave an annular ring slit, a cylindrical short pipe open at its two ends, said pipe being connected to the smaller opening of said funnel-shaped shutter.

10. A device as claimed in claim 9, which comprises pipes for the supply of an auxiliary gas, said pipes projecting radially into the interior of the short pipe and being disposed at said short pipe.

11. A device as claimed in claim 9, which comprises pipes for the supply of an auxiliary gas, said pipes projecting tangentially into the interior of the short pipe and being disposed at said short pipe.

12. A device as claimed in claim 1, which comprises spraying nozzles disposed in the furnace center section at a position below the shutter.

13. A device as claimed in claim 1, which comprises a circulating pump and a continuous cooler to circulate and cool the cycled oil.

References Cited in the file of this patent

UNITED STATES PATENTS

| | | |
|---|---|---|
| 1,497,173 | Hechenbleikner | June 10, 1924 |
| 2,080,930 | Rose | May 18, 1937 |
| 2,731,410 | Weir | Jan. 17, 1956 |
| 2,916,534 | Schallus et al. | Dec. 8, 1959 |
| 2,978,316 | Weir | Apr. 14, 1961 |